United States Patent [19]
Fiedler et al.

[11] Patent Number: 6,163,205
[45] Date of Patent: Dec. 19, 2000

[54] CHARGE PUMP

[75] Inventors: Gerhard Fiedler, Neckartailfingen; Wolfgang Rentz, Neckartenzlingen, both of Germany

[73] Assignee: Robert Bosch GmbH, Stuttgart, Germany

[21] Appl. No.: 09/186,266

[22] Filed: Nov. 4, 1998

[30] Foreign Application Priority Data

Nov. 4, 1997 [DE] Germany .......................... 197 48 577

[51] Int. Cl.⁷ .................................................. G05F 1/10
[52] U.S. Cl. ............................ 327/536; 327/531; 363/60
[58] Field of Search ................................. 327/536, 537, 327/589, 306, 343, 344, 531, 337; 326/88; 363/60

[56] References Cited

U.S. PATENT DOCUMENTS

| | | | |
|---|---|---|---|
| 4,433,253 | 2/1984 | Zapisek | 327/536 |
| 4,962,512 | 10/1990 | Kiuchi | 377/78 |
| 5,029,063 | 7/1991 | Lingstaedt et al. | 363/60 |
| 5,036,229 | 7/1991 | Tran | 327/536 |
| 5,216,588 | 6/1993 | Bajwa et al. | 363/60 |
| 5,280,420 | 1/1994 | Rapp | 363/60 |
| 5,483,434 | 1/1996 | Seesink | 363/60 |
| 5,748,032 | 5/1998 | Baek | 327/536 |
| 5,874,850 | 2/1999 | Pulvirenti et al. | 327/536 |

FOREIGN PATENT DOCUMENTS 43 24 855  9/1994  Germany .

*Primary Examiner*—Timothy P. Callahan
*Assistant Examiner*—Hai L. Nguyen
*Attorney, Agent, or Firm*—Kenyon & Kenyon

[57] ABSTRACT

A charge pump, to generate a voltage (overvoltage) greater than the supply voltage, includes disk capacitors triggered via an oscillator circuit, the first terminals of the disk capacitors being connected to the oscillator circuit and their second terminals being wired together in a node to which the overvoltage is applied. The oscillator circuit includes an R-C phase shifter oscillator at whose outputs three output signals, phase shifted 120°, are applied, and the outputs are connected to disk capacitors via differential voltage current amplifiers.

4 Claims, 2 Drawing Sheets

CHARGE PUMP

FIELD OF THE INVENTION

The present invention relates to a charge pump to generate a voltage (overvoltage) greater than the supply voltage.

BACKGROUND INFORMATION

Charge pumps are known and are used to supply individual components of a circuit arrangement with a voltage greater than the supply voltage (operating voltage). German Patent No. 43 24 855 C1 describes a charge pump having two-stage triggering in that two pump halves, each having a disk capacitor, are triggered via an oscillator. The two disk capacitors are triggered with an approximately 180° phase shift. Fundamental frequencies, resulting in interference radiation, are superimposed on the voltage signals due to a delay as the oscillator is switched over. In order to eliminate this interference radiation, an additional backup capacitor is needed which is also connected to the supply voltage as an interference suppressing capacitor.

SUMMARY OF THE INVENTION

The charge pump according to the present invention has the advantage that overvoltage can be provided without additional interference suppressing means. Due to the fact that the oscillator circuit includes an R-C phase shifter oscillator, three sinusoidal output signals, phase-shifted by 120°, are obtained at its outputs, the outputs are connected to the disk capacitors via a switching means preferably designed as a differential voltage current amplifier, and the electromagnetic compatibility (EMC) interference radiation is strongly reduced, since output signals shifted by 120° can very accurately be obtained using the phase shifter oscillator, so that the fundamental frequency components produced by the delays can be almost fully eliminated. In addition, in the case of three phase-shifted signals, at no time do all three signals go through a point of inflection in the characteristic curve. Thus no additional interference (suppression) means need to be installed for the charge pump.

In a preferred embodiment of the present invention, the second terminals of the disk capacitors are connected, via a bridge rectifier, to a node that is at output pump voltage. A smoothed pump voltage with a minimized interfering current peak component is thus obtained via the preferably three-phase bridge rectification. In particular, if the bridge rectifier is also connected to the supply voltage via a current source, the appearance of interfering current peaks in the charge pump lead can be prevented if the charge phases of at least two of the disk capacitors overlap.

DETAILED DESCRIPTION

Figure 1:
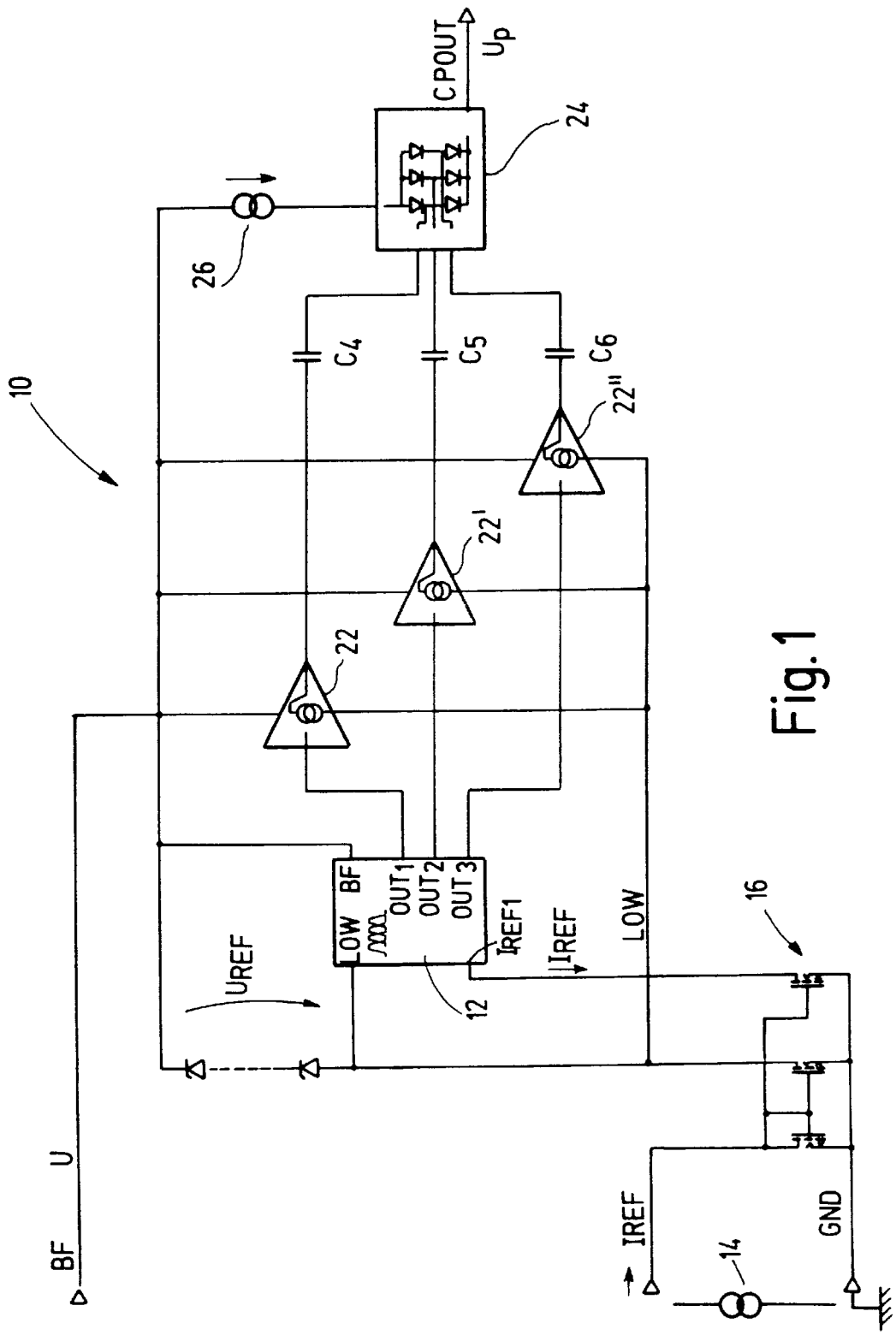
FIG. 1 shows a circuit arrangement of a charge pump.

FIG. 1 shows the circuit arrangement of a charge pump 10. The charge pump includes a phase shifter oscillator 12, at whose input BF there is a supply voltage (operating voltage) U and at whose LOW input there is a reference voltage $U_{REF}$. Reference voltage $U_{REF}$ smoothes fluctuations in operating voltage U, so that phase shifter oscillator 12 is operated using a stabilized voltage. Phase shifter oscillator 12 receives a reference current $I_{REF}$ via a reference current source 14. Reference current source 14 is coupled to phase shifter oscillator 12 via a current balancing circuit 16, so that a reference current $I_{REF}$ of reference current source 14 is identical to reference current $I_{REF}$ of phase shifter oscillator 12.

Figure 2:
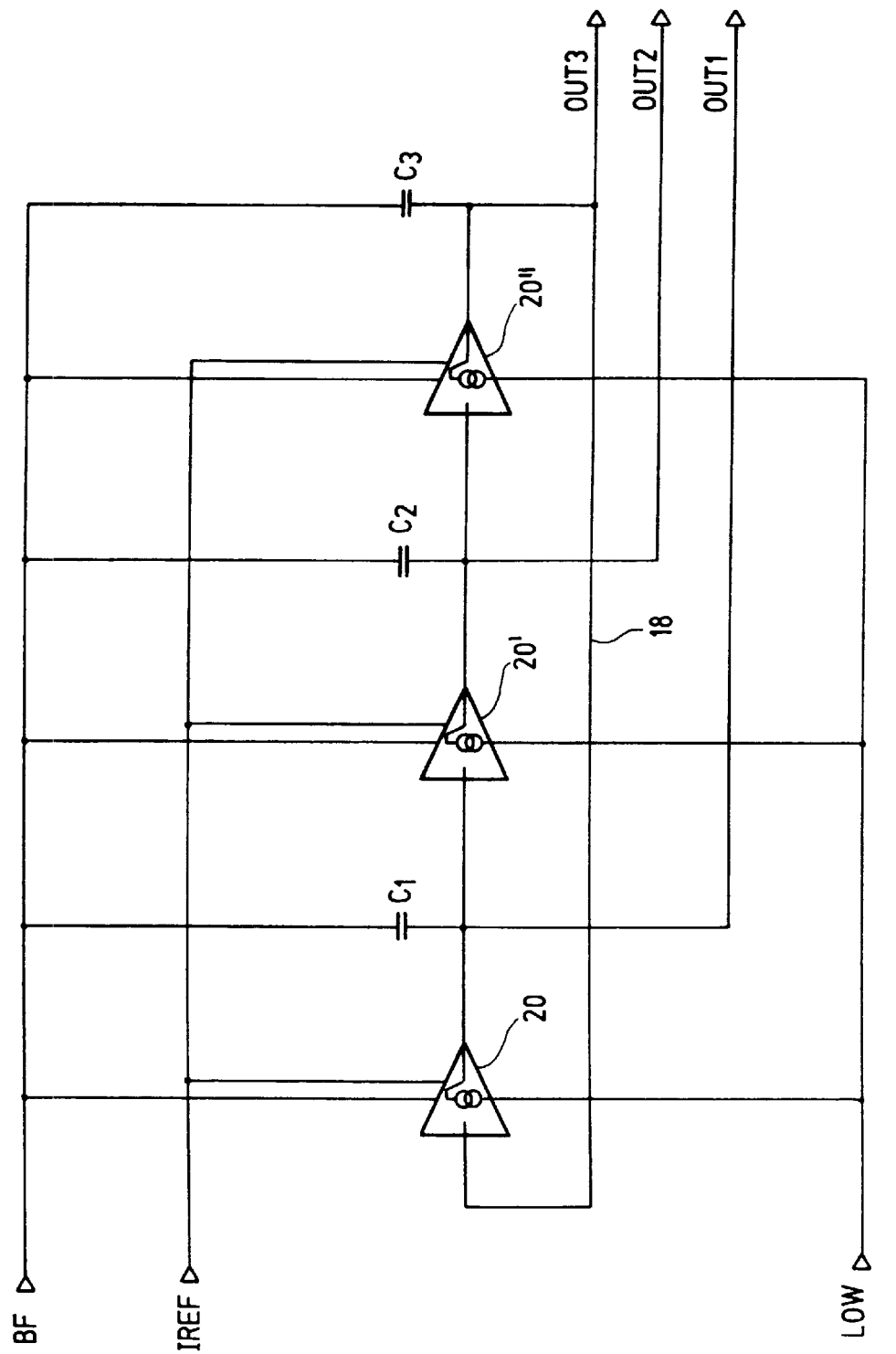
FIG. 2 shows a circuit arrangement of a phase shifter oscillator of the charge pump.

The circuit design of phase shifter oscillator 12 illustrated in FIG. 2 is constituted by "R"-C combinations formed by capacitors $C_1$, $C_2$, and $C_3$, as well as three differential voltage-current amplifiers 20, 20', and 20" connected in series and back-coupled via a connecting lead 18. Differential voltage-current amplifiers 20 are wired so that they represent the high-resistance resistor ("R"). An output current $I_{OUT}$ at outputs OUT1, OUT2, and OUT3 results from the equation:

$$I_{OUT} = X(U_{OUT} - U_{IN})$$

where x is a constant (transconductance of the differential voltage current amplifier), $U_{OUT}$ is the output voltage, and $U_{IN}$ is the input voltage of the differential voltage current amplifiers. Reference current $I_{REF}$ forms the reference input for a quadrature-axis current component of the difference pair of the differential voltage current amplifiers.

With the circuit arrangement according to FIG. 2, three sinusoidal output signals, phase shifted by 120°, are obtained at outputs OUT1, OUT2, and OUT3.

Outputs OUT1, OUT2, and OUT3 are connected to the respective inputs of differential voltage current amplifiers 22, 22', and 22". Operating voltage U and reference voltage $U_{REF}$ are applied to differential voltage current amplifiers 22, 22', and 22" via signal lead LOW. Furthermore, differential voltage current amplifiers 22, 22', and 22" receive a reference current via terminals that are not shown. The outputs of differential voltage current amplifiers 22, 22', and 22" are connected to first terminals of disk capacitors $C_4$, $C_5$, and $C_6$, respectively. The second terminals of disk capacitors $C_4$, $C_5$, and $C_6$ are connected to a three-phase bridge rectifier 24, at whose output terminal $C_{POUT}$ pump voltage $U_p$ (overvoltage) is applied. Bridge rectifier 24 is also connected to operating voltage U via a current source 26.

Disk capacitors $C_4$, $C_5$, and $C_6$ are triggered by the three sinusoidal output signals with a 120° phase shift via differential voltage current amplifiers 22, 22', and 22", respectively. Depending on the point in time when the phase-shifted output signals are generated, disk capacitors $C_4$, $C_5$, and $C_6$ are charged or discharged. Depending on the voltage difference, applied to differential voltage current amplifiers 22, between a reference voltage and the output signals delivered from outputs OUT1, OUT2, and OUT3 of phase shifter oscillator 12, a positive or negative charge current of disk capacitors $C_4$, $C_5$, and $C_6$ is obtained.

Overlaps in the charge phases of disk capacitors $C_4$, $C_5$, and $C_6$ are obtained due to the output signals, shifted 120°, of phase shifter oscillator 12, so that two of the disk capacitors $C_4$, $C_5$, and $C_6$ are always being charged or discharged simultaneously. In order to avoid current peaks generated thereby, bridge rectifier 24 receives a constant current from current source 26, resulting in a smoothed pump voltage UP. Due to the fact that the current peaks are eliminated due to the decoupling of outputs OUT1, OUT2, and OUT3 from disk capacitors $C_4$, $C_5$, and $C_6$ via differential voltage current amplifiers 22, 22', 22", the appearance of undesirable current peaks can be avoided. In a specific embodiment, capacitors $C_1$, $C_2$, $C_3$ can have a capacitance of approximately 4 to 10 pF depending on the frequency, and capacitors $C_4$, $C_5$, and $C_6$ can have a capacitance of approximately 20 to 100 pF depending on the required load current at output terminal $C_{POUT}$.

What is claimed is:

1. A charge pump for generating an overvoltage greater than a supply voltage, comprising:

a plurality of disk capacitors, each of the disk capacitors having a second terminal, the second terminals being connected together in a node to which the overvoltage is applied;

a plurality of switching elements, wherein the switching elements include differential voltage current amplifiers; and an oscillator circuit for triggering the disk capacitors, the oscillator circuit including an R-C phase shifter oscillator, the oscillator providing three output signals at three respective outputs of the oscillator, the three output signals being phase shifted by 120°, each of the outputs of the oscillator being coupled to a first terminal of a respective one of the disk capacitors through a respective one of the switching elements.

2. A charge pump for generating an overvoltage greater than a supply voltage, comprising:

a plurality of disk capacitors, each of the disk capacitors having a second terminal, the second terminals being connected together in a node to which the overvoltage is applied;

a plurality of switching elements;

an oscillator circuit for triggering the disk capacitors, the oscillator circuit including an R-C phase shifter oscillator, the oscillator providing three output signals at three respective outputs of the oscillator, the three output signals being phase shifted by 120°, each of the outputs of the oscillator being coupled to a first terminal of a respective one of the disk capacitors through a respective one of the switching elements;

wherein the oscillator includes differential voltage current amplifiers configured as high-resistance resistors, the amplifiers together with further capacitors forming R-C elements associated with the outputs of the oscillator.

3. A charge pump for generating an overvoltage greater than a supply voltage, comprising:

a plurality of disk capacitors, each of the disk capacitors having a second terminal, the second terminals being connected together in a node to which the overvoltage is applied;

a plurality of switching elements;

an oscillator circuit for triggering the disk capacitors, the oscillator circuit including an R-C phase shifter oscillator, the oscillator providing three output signals at three respective outputs of the oscillator, the three output signals being phase shifted by 120°, each of the outputs of the oscillator being coupled to a first terminal of a respective one of the disk capacitors through a respective one of the switching elements; and a bridge rectifier connecting the second terminals of the disk capacitors to the node.

4. The charge pump according to claim 3, further comprising a current source connecting the bridge rectifier to the supply voltage.

* * * * *